(12) United States Patent  
de los Reyes et al.

(10) Patent No.: US 9,396,310 B2
(45) Date of Patent: Jul. 19, 2016

(54) METHOD AND APPARATUS FOR PROVIDING SECURE IMAGE ENCRYPTION AND DECRYPTION

(71) Applicant: AT&T Intellectual Property I, L.P., Atlanta, GA (US)

(72) Inventors: Gustavo de los Reyes, Fair Haven, NJ (US); Andrea Forte, Brooklyn, NY (US); Juan A. Garay, Guttenberg, NJ (US); David Crawford Gibbon, Lincroft, NJ (US); Zhu Liu, Marlboro, NJ (US); Evgene Vahlis, Jersey City, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 439 days.

(21) Appl. No.: 13/942,260

(22) Filed: Jul. 15, 2013

(65) Prior Publication Data

US 2015/0016602 A1     Jan. 15, 2015

(51) Int. Cl.
| | |
|---|---|
| *G06F 21/62* | (2013.01) |
| *G06F 21/00* | (2013.01) |
| *H04N 1/32* | (2006.01) |
| *H04N 1/44* | (2006.01) |
| *G09C 5/00* | (2006.01) |
| *H04L 9/08* | (2006.01) |

(52) U.S. Cl.
CPC ............ *G06F 21/00* (2013.01); *G06F 21/6209* (2013.01); *G09C 5/00* (2013.01); *H04L 9/088* (2013.01); *H04N 1/32272* (2013.01); *H04N 1/4486* (2013.01)

(58) Field of Classification Search
None
See application file for complete search history.

(56) References Cited

U.S. PATENT DOCUMENTS

| | | | |
|---|---|---|---|
| 6,954,532 B1 * | 10/2005 | Handley et al. | 380/54 |
| 7,021,534 B1 * | 4/2006 | Kiliccote | 235/380 |
| 7,986,784 B2 * | 7/2011 | Dokuni | 380/243 |
| 8,140,857 B2 * | 3/2012 | Forlenza et al. | 713/189 |
| 8,306,221 B2 * | 11/2012 | Takahashi et al. | 380/55 |
| 8,433,067 B2 * | 4/2013 | Nakagata et al. | 380/205 |
| 8,515,062 B2 * | 8/2013 | Nakagata et al. | 380/54 |
| 8,810,862 B2 * | 8/2014 | Yoshio et al. | 358/3.28 |
| 8,938,671 B2 * | 1/2015 | Eisen et al. | 715/271 |
| 2007/0028099 A1 * | 2/2007 | Entin et al. | 713/163 |
| 2007/0132966 A1 * | 6/2007 | Widdowson et al. | 353/121 |
| 2008/0118064 A1 * | 5/2008 | Bhogal et al. | 380/243 |
| 2008/0279380 A1 * | 11/2008 | Hayashi | 380/243 |
| 2009/0245511 A1 * | 10/2009 | Nakagata et al. | 380/54 |
| 2009/0245512 A1 * | 10/2009 | Masui et al. | 380/54 |
| 2009/0285496 A1 * | 11/2009 | Collins | 382/232 |
| 2010/0046753 A1 * | 2/2010 | Inami et al. | 380/243 |
| 2010/0074437 A1 * | 3/2010 | Inami et al. | 380/28 |
| 2010/0316222 A1 * | 12/2010 | Inami et al. | 380/277 |
| 2011/0019816 A1 * | 1/2011 | Inami et al. | 380/28 |
| 2012/0121086 A1 * | 5/2012 | Nakagata et al. | 380/243 |
| 2013/0100502 A1 * | 4/2013 | Takahashi et al. | 358/3.28 |
| 2013/0272523 A1 * | 10/2013 | McCorkindale et al. | 380/243 |

\* cited by examiner

*Primary Examiner* — Benjamin Lanier

(57) ABSTRACT

Methods, non-transitory computer readable media and apparatuses for decrypting an image are disclosed. For example, a method captures a portion of an encrypted image and decrypts the portion of the image using a decryption key. The portion of the image contains partial information for an adjacent portion of the image. The method then displays the portion of the image that is decrypted and also displays the adjacent portion of the image using the partial information for the adjacent portion of the image. Another method includes capturing a first portion of an image that is encrypted using a first key and a second key, decrypting the first portion of the image using a first key and displaying the first portion of the image that is decrypted.

20 Claims, 6 Drawing Sheets

METHOD AND APPARATUS FOR PROVIDING SECURE IMAGE ENCRYPTION AND DECRYPTION

The present disclosure relates generally to privacy and decryption of documents and, more particularly, to a method, computer readable medium, and apparatus for decrypting encrypted images and documents.

BACKGROUND

Certain professions require that documents be kept confidential to maintain privacy of individuals and/or such that only certain individuals having a certain clearance level will have access to certain documents. For example, it may be important in the health care industry to keep patient records confidential. A user may access a website, an electronic document or a paper-document and may want to make sure that the user is the only one able to view the information. In other words, the user may want to ensure that people in the vicinity of the user are not "spying" as the user is viewing the information. In addition, once a confidential document has been decrypted and printed, there is no guarantee that the confidential document will not end up or be read by unauthorized personnel.

SUMMARY

In one embodiment, the present disclosure provides a method, computer readable medium, and apparatus for decrypting an image. For example, a method captures a portion of an encrypted image and decrypts the portion of the image using a decryption key. The portion of the image contains partial information for an adjacent portion of the image. The method then displays the portion of the image that is decrypted and also displays the adjacent portion of the image using the partial information for the adjacent portion of the image.

In another embodiment, the present disclosure provides a further method, computer readable medium and apparatus for decrypting an image. For example, the method includes capturing a first portion of an image that is encrypted using a first key and a second portion of an image that is encrypted using a second key, decrypting the first portion of the image using a first key and displaying the first portion of the image that is decrypted and the second portion in an encrypted form.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, non-transitory (i.e., tangible or physical) computer readable storage media, and apparatuses for decrypting an image or document. As noted above, certain professions require that documents be kept confidential to maintain privacy of individuals or such that only certain individuals having a certain clearance level will have access to certain documents. However, once a document is printed or published there is no guarantee that it will not end up or be read by unauthorized personnel unless the document is destroyed.

Embodiments of the present disclosure provide decryption methods such that a document may remain encrypted and only those with appropriate access may decrypt and view the encrypted document, or one or more portions of the encrypted document. For example, a device is used to capture at least a portion of the encrypted image, e.g., using a camera, to decrypt the portion of image and to present the decrypted portion to a user locally on a display of the device. At all times the encrypted document remains encrypted.

Figure 1:
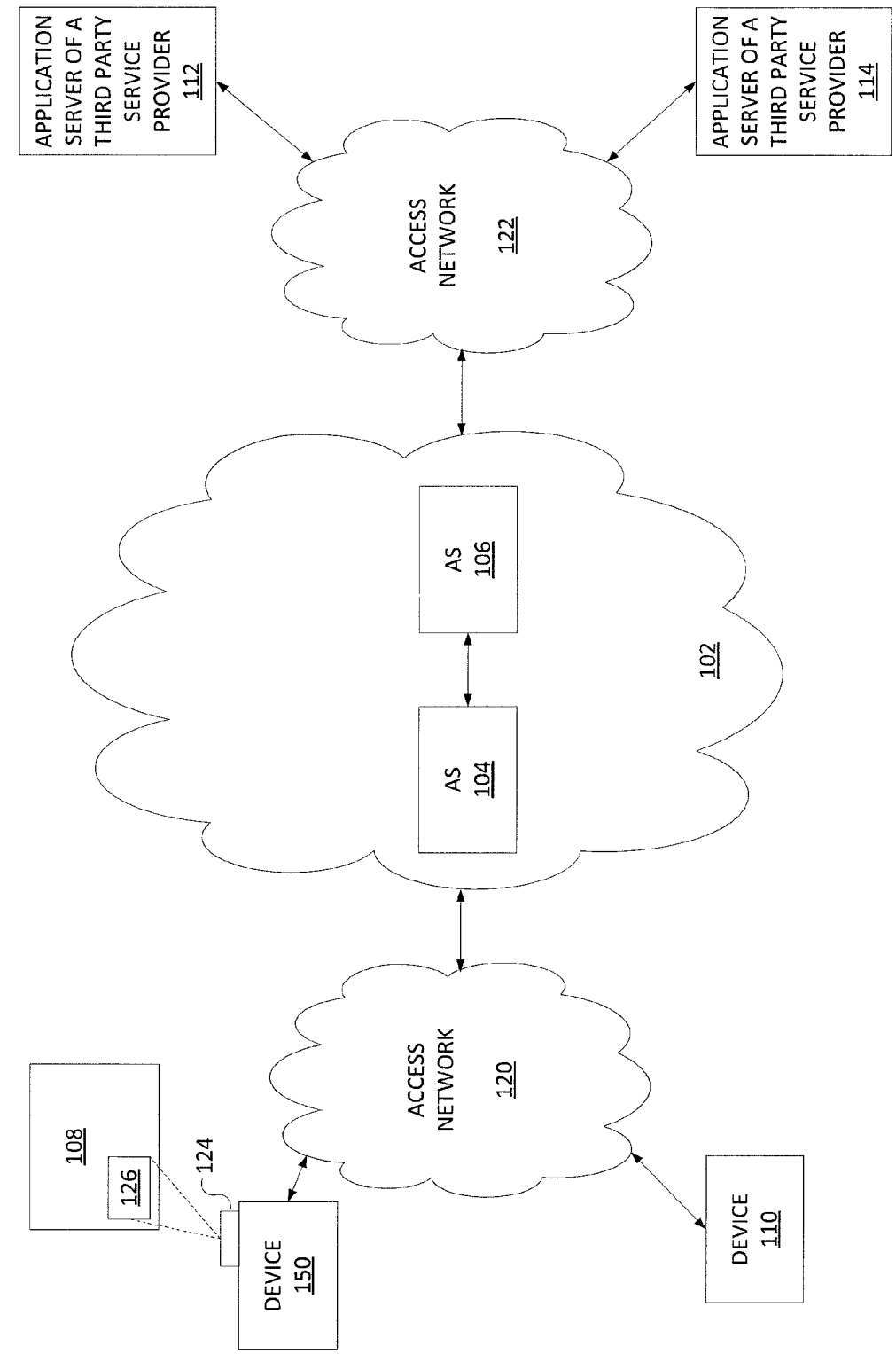
FIG. 1 illustrates one example of a communication network of the present disclosure.

FIG. 1 is a block diagram depicting one example of a communication network 100. The communication network 100 may be any type of communication network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., an IEEE 802.11/Wi-Fi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed.

Figure 6:
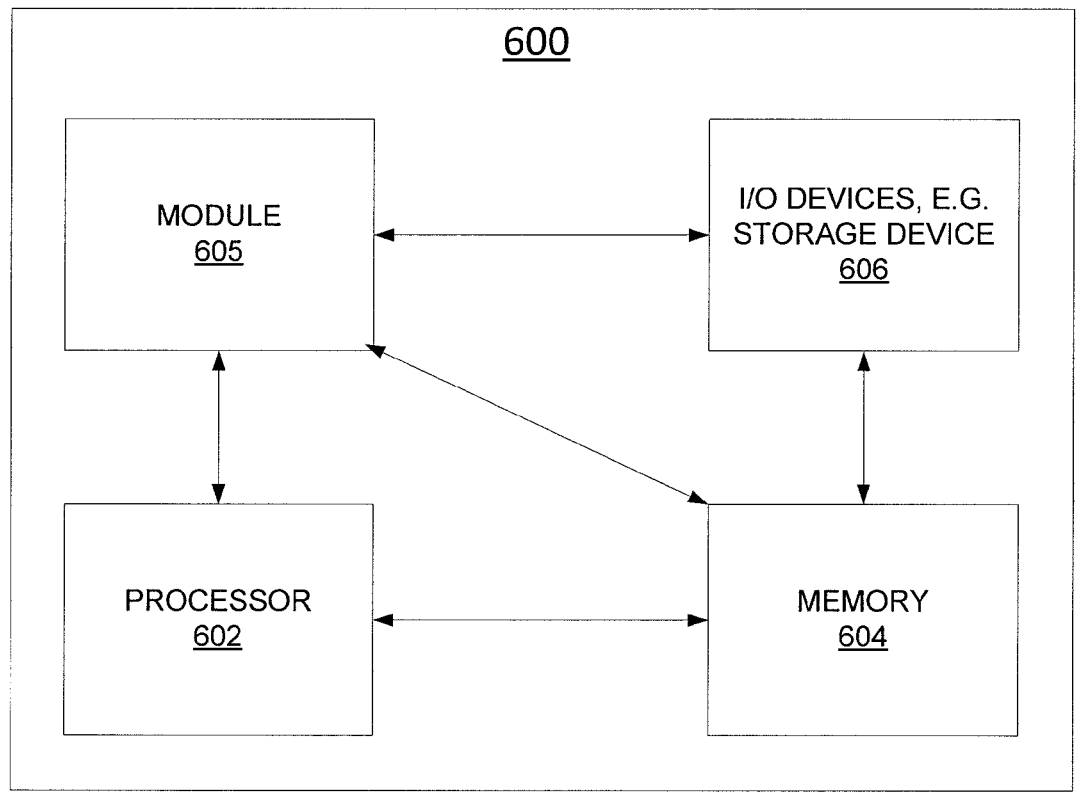
FIG. 6 illustrates a high-level block diagram of a general-purpose computer suitable for use in performing the functions described herein.

In one embodiment, the AS 104 may comprise a general purpose computer as illustrated in FIG. 6 and discussed below. In one embodiment, the DB 106 may store personal information of the subscribers of the communication network 100, such as the subscribers' user identification (uid), public and private key information, encryption and decryption keys, and the like. In embodiment, the core network 102 may be operated by a communication network service provider.

In one embodiment, the access network 120 may be in communication with one or more devices 150 and 110. In one embodiment, the one or more devices 150 and 110 may be augmented reality (AR) decryption devices with each device having an image capturing device 124. In one embodiment, the image capture device 124 may be used to capture at least a portion 126 of an image or document, e.g., displayed by a display device 108, e.g., a screen, a monitor and the like.

In one embodiment, the device 108 may be any device having a display capable of displaying an image or printing a document. For example, the device 108 may be a mobile device, a laptop, a tablet computer, a desktop computer, a printer, a scanner, a copying machine, and the like. The image may be an electronic document (e.g., a web page on a computer monitor, an electronic email, a word processing document, a spreadsheet, and the like), or even a video comprised of a series of frames displayed by the device 108 or a physical document (e.g., a printed document on paper) produced or printed by the device 108. However, it should be noted that the document can be printed by any device and is not limited to device 108. In this regard, it should be noted that in the present disclosure, the terms image and document are used interchangeably, e.g., referring to both a printed image/document and/or an electronic image/document.

In one embodiment, the device 150 may be any single device or a combination of devices that is capable of capturing an image, implementing encryption and decryption algorithms and having a display. In one embodiment, the augmented reality device may be a mobile endpoint device, such as for example, a cell phone, a smart phone, a tablet, a net book, a laptop computer, an eye wear such as glasses, and the like that is capable of communicating over a communication network, either wirelessly or via a wired connection. In one embodiment, the device 150 may comprise a mobile endpoint device having a camera or video camera and that is in communication with a pair of augmented reality decryption glasses lacking an image capture device. In another embodiment, the device 150 may be implemented as a pair of augmented reality glasses having a display and a camera with wireless capabilities to communicate with the communication network 100. In still another embodiment, the device 150 may comprise a computing device as illustrated in FIG. 6 and discussed below.

In one embodiment, the access network 122 may be in communication with one or more third party service providers 112 and 114. For example, the third party service providers 112 and 114 may include service providers such as, for example, a financial institution, e.g., a bank, a health care provider, e.g., a doctor, a hospital, a medical laboratory, and the like. In one embodiment, the third party service providers 112 and 114 may need to provide documents, either physically or electronically, that are considered to be sensitive or confidential to a user. In one embodiment, the access network 122 is connected to one or more computers or local networks of the respective third party service providers 112 and 114, e.g., to enable the provisioning, transmission and reception of documents, encryption and decryption keys, and so forth.

It should be noted that the network 100 has been simplified. For example, the network 100 may include other network elements (not shown) such as border elements, routers, switches, policy servers, security devices, gateways, a content distribution network (CDN) and the like.

Figure 2:
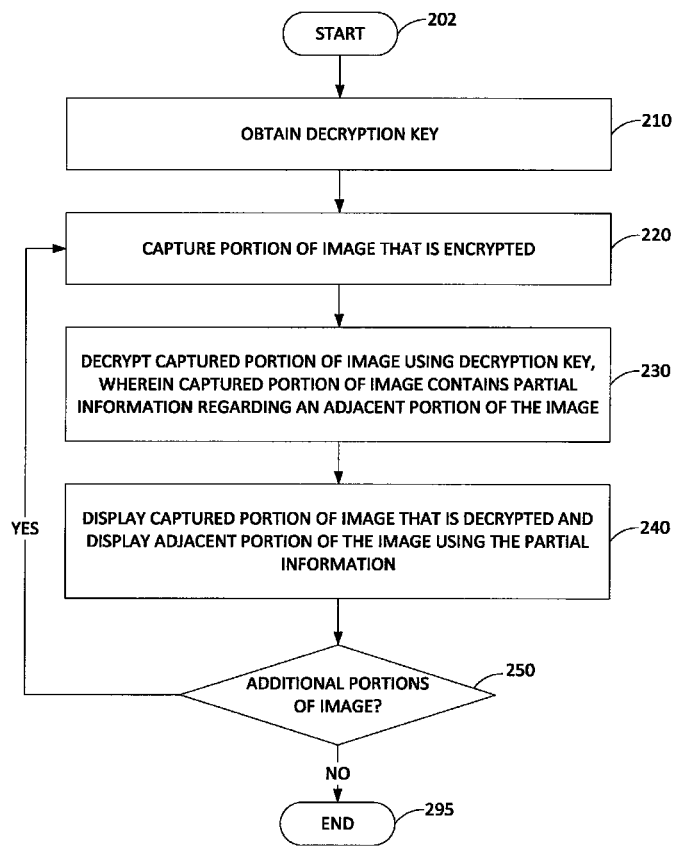
FIG. 2 illustrates an example flowchart of a method for decrypting an image.

FIG. 2 illustrates an example flowchart of one embodiment of a method 200 for decrypting an image. In one embodiment, the method 200 may be performed by the device 150. In one embodiment, the steps, functions, or operations of method 200 may be performed by a computing device 600 as described in connection with FIG. 6 below.

The method 200 begins at step 202 and proceeds to step 210. At step 210, the method obtains a decryption key for a document. The document may be an encrypted document/image comprising an account statement sent by a bank to a customer, medical information sent from a hospital or doctor to a patient, and so forth. In one embodiment, the encrypted document is displayed on a screen of a computer, a television, an electronic billboard or the like. For example, the document may be an email, a web page, a word processing document, a spreadsheet document, an image, a picture, a map, a graph, and the like. In another embodiment, the encrypted document is a physical document, or is printed or provided in hard-copy. For example, the encrypted document may comprise an 8½× 11 sheet of paper, a page in a book, a billboard, a poster, a projection on a wall or screen, or practically any other type of image.

In one embodiment the encrypted document is visually encoded by dividing the image or video frame of the document into blocks. However, it should be noted that cipher blocks are not visible in the visual encoding. In one embodiment, taking into account color and light balance, the image of the document is encoded using a gray scale or colors with enough separation between the gray scales or colors so that instead of trying to identify the actual color (e.g., blue vs. yellow), a device is able to distinguish between different gray scales or colors (i.e., color 1 vs. color 2). Although one example was provided above, any visual encoding algorithm may be used. Each block may then be individually encrypted using the Advanced Encryption Standard (AES). In one embodiment, the encryption may be performed using a random nonce.

In one embodiment, the encryption may be performed by using an n×m matrix of the blocks. For example, a per-document encryption key $K_{doc}$ can be used to encrypt the matrix block by block. In one embodiment, the cell I and column j may be encrypted according to a function $C_{i,j}=[k, j, F_{Kdoc}(i, j) \oplus M_{i,j}]$, where F is a block cipher, such as AES. The above encryption method may use less memory and be more efficient than other currently used methods of encryption. However, it should be noted that embodiments of the present disclosure may employ both symmetric and asymmetric block ciphers and/or keys. Thus, in one instance $K_{doc}$ is a symmetric key that is used for both encrypting and decrypting operations. In another instance, $K_{doc}$ comprises a public key. A person or device in possession of the corresponding private key would then be able to decipher the document, or blocks of the document that are encrypted using the public key $K_{doc}$. Accordingly, the term "key", as used herein, may also be understood to refer to a public-private key pair in various instances.

In one embodiment, the encryption is performed by any one or more of the Application Server (AS) 104, a device of the third party service provider 112, a device of the third party service provider 114, or a computing device such as described in connection with FIG. 6 below. In one embodiment, the key received at step 210 comprises a decryption key that is complimentary to the encryption key $K_{doc}$ and is received at step 210 from any one or more of such devices. For instance, the decryption key may be received directly from a device that performs the encryption. In another example, a third party service provider encrypts the document while the decryption key is received at step 210 from the AS 104 of communication network 102. For example, the third party service provider 112 may register with an application server (or any hardware equivalents or systems) of a communication network service provider of the communication network 102. For example, the third party service provider 112 may be a bank and the communication network service provider may be a cellular communication service provider that provides mobile communication services to subscribers and/or operates the core network 102. As such, the communication network service provider may perform an authentication, e.g., of a device performing the method 200. For example, the device may be required to request the decryption key from the core network 102. In addition, to ensure that a user is not trying to decrypt a document that belongs to another individual (e.g., a user reading over the shoulder of another user), the communication network service provider may verify that the ID of the user matches an ID of the device, or may use a login and password that is associated with both the device and the user. If the authentication is successful, the communication network service provider then sends the decryption key for the document which is received at step 210.

At step 220, the method 200 captures a portion of the document. For example, the method may visually capture the block or portion of the document via an image capturing device, e.g., a camera. In one embodiment, the method 200 requests a document from a core network and/or third party service provider and, in response, is provided with an encrypted image/document. For example, a user may use a personal computer (PC) to login to his or her online bank account and request that a bank statement be delivered, e.g., for display on the PC screen or for printing to an attached printer. In another embodiment, an image is publicly displayed, e.g., an electronic or a static billboard or poster, a physical document, a television screen, a computer, phone or tablet screen, or the like. In any case, step 220 may comprise the use of a camera or other image capturing device to capture a portion of an image/document that is electronically or physically available. Notably, the image is visually encrypted, e.g., using a technique as described above. As such, the image may contain sensitive, private or confidential information but is not discernible in the present format in which the image is presented. To illustrate, the image/document may be presented on display device 108 in FIG. 1 and captured by camera 124.

At step 230, the method 200 decrypts the portion of the encrypted document that is captured at step 220. For example, a 10 inch by 10 inch document may be segmented such that any 2 inch by 2 inch portion or block within the 10 inch by 10 inch document may be captured at step 220 and decrypted at step 230. In one embodiment, the decryption key received at step 210 is used to perform the decryption of the portion of the document at step 230. Notably, any available decryption algorithm may be used to decrypt the encrypted data and to decrypt a portion or subset of the entire document. In addition, in one embodiment, each block or portion of the document that is visually encrypted includes data and information to enable the unencrypted display of that particular portion of the image in addition to partial information relating to one or more adjacent portions of the image. For example, the encrypted visual data for the captured portion of the image may comprise sufficient data to enable the display of a higher resolution unencrypted version of that particular portion of the image while the additional data allows the display of lower resolution versions of the one or more adjacent portions of the image.

At step 240, the method 200 displays the captured portion of the document that is decrypted and also displays the one or more adjacent portions of the image using the partial information obtained at step 230.

Figure 3:
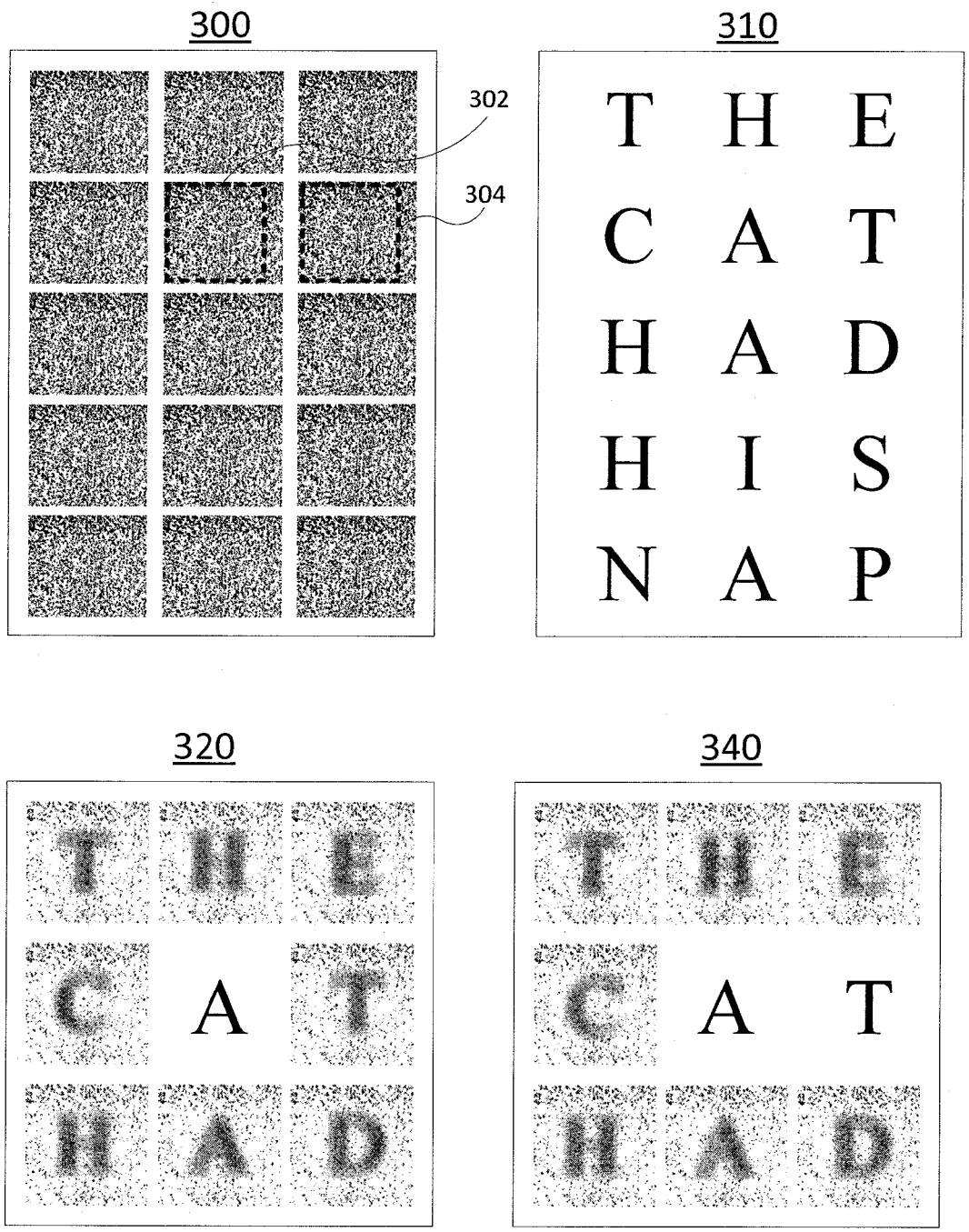
FIG. 3 illustrates an example of a document in encrypted and unencrypted forms, and the display of decrypted portions of the document.

As an example, FIG. 3 illustrates an encrypted document/image 300. For reference, an unencrypted or true version of the document 310 is also shown. In one example, the method 200 may capture a first portion 302 of the encrypted document 300 and decrypt the visually encrypted data using the decryption key received at step 210. Accordingly, in FIG. 3 the result of step 230 is shown on screen 320, e.g., on a display of a device performing the method 200. For instance, the decryption of the captured portion of the image results in the display of that portion of the unencrypted image. In this case, the captured portion contains the letter "A". In addition, low resolution versions of the adjacent portions of the image are also contained within the visually encrypted information in the first portion 302. For instance, as shown on screen display 320, it can be discerned that the adjacent portions include the letters T, H, E, C, T, H, A and D. It should be noted that divisions or boundaries between portions of the image 300 are emphasized in FIG. 3. However, in one embodiment such boundaries are not visible, or are not discernible to a viewer. For instance, the portions of the image may be directly adjacent to one another, and since the portions or block are all ciphered, they appear as a single ciphered region.

Notably, because the decryption process can take some time, in one embodiment the present method 200 may give a user an early indication as to adjacent portions that he or she may want to decrypt next based upon the display of the partial information for the adjacent portions of the document. For instance, if the document comprises a road map and it appears that an adjacent portion to the left of the current portion comprises water (e.g., due to a mostly blue appearance), whereas the adjacent portion to the right of the current portion appears to comprise land (e.g., due to a mostly green and brown appearance), it may inform a user to next decrypt the adjacent portion to the right, i.e., moving the device 150 to the right.

Alternatively, in one alternate embodiment, the method 200 may not display the decrypted lower resolution adjacent portions even though the partial information for the adjacent portions of the document has been decrypted. In this embodiment, the decrypted lower resolution adjacent portions are simply made available to the hardware processor (or the software application) so that as the user slides the device 150 along different portions of the encrypted document, the decrypting process will proceed smoothly, i.e., without significant pauses before another adjacent decrypted portion is displayed. This will provide greater privacy in that a more limited amount of information is presented to the user, i.e., only one block at a time, versus nine (9) blocks as discussed above. However, it should be noted that any number of blocks can be displayed based on the requirements of a particular deployment.

Following step 240, the method 200 proceeds to step 250 where the method determines if there are further portions of the encrypted document to be decrypted. For example, a camera may be moved to a different position in relation to the encrypted document such that it is now capturing a different portion. In such case, the method proceeds back to step 220 to continue to capture, decrypt and display the additional portion of the document.

To illustrate, in FIG. 3 a second portion 304 of the encrypted document 300 is shown. When decrypted at step 230, it includes sufficient information to display a higher resolution version of that portion of the image as well as lower resolution information pertaining to one or more adjacent portions. The result is shown on screen 340. In particular, portion 304 contains the letter "T" which is now more clearly readable on screen 340. Notably, the letter "A" from first portion 302 is also clearly readable since portion 302 was previously decrypted in the first iteration of the method 200. A similar process may be followed with respect to any or all of the remaining portions of the document/image to be decrypted. It should also be noted that although the displays 320 and 340 appear to show less than a full document on a single screen, the present disclosure is not so limited. Namely, in one embodiment the displays 320 and 340 may appear on a screen of a mobile device, which may be of a smaller size than the original document. However, in another embodiment, the full image/document may be projected on a display in a zoomed or scaled format. In still another embodiment, the entire decrypted version of the encrypted data is not displayed at the same time, but only a subset of the decrypted version of the encrypted data is shown. In addition, it should be noted that the encrypted data remains encrypted on the document, e.g., as printed or as displayed on device 108, during decryption.

If there are no further portions of the encrypted document to be captured and decrypted, or if the method determines to stop prior to capturing and decrypting all portions of the document, e.g., where a user may decide to quit before finishing the document, the method proceeds from step 250 to step 295 where the method ends.

Figure 4:
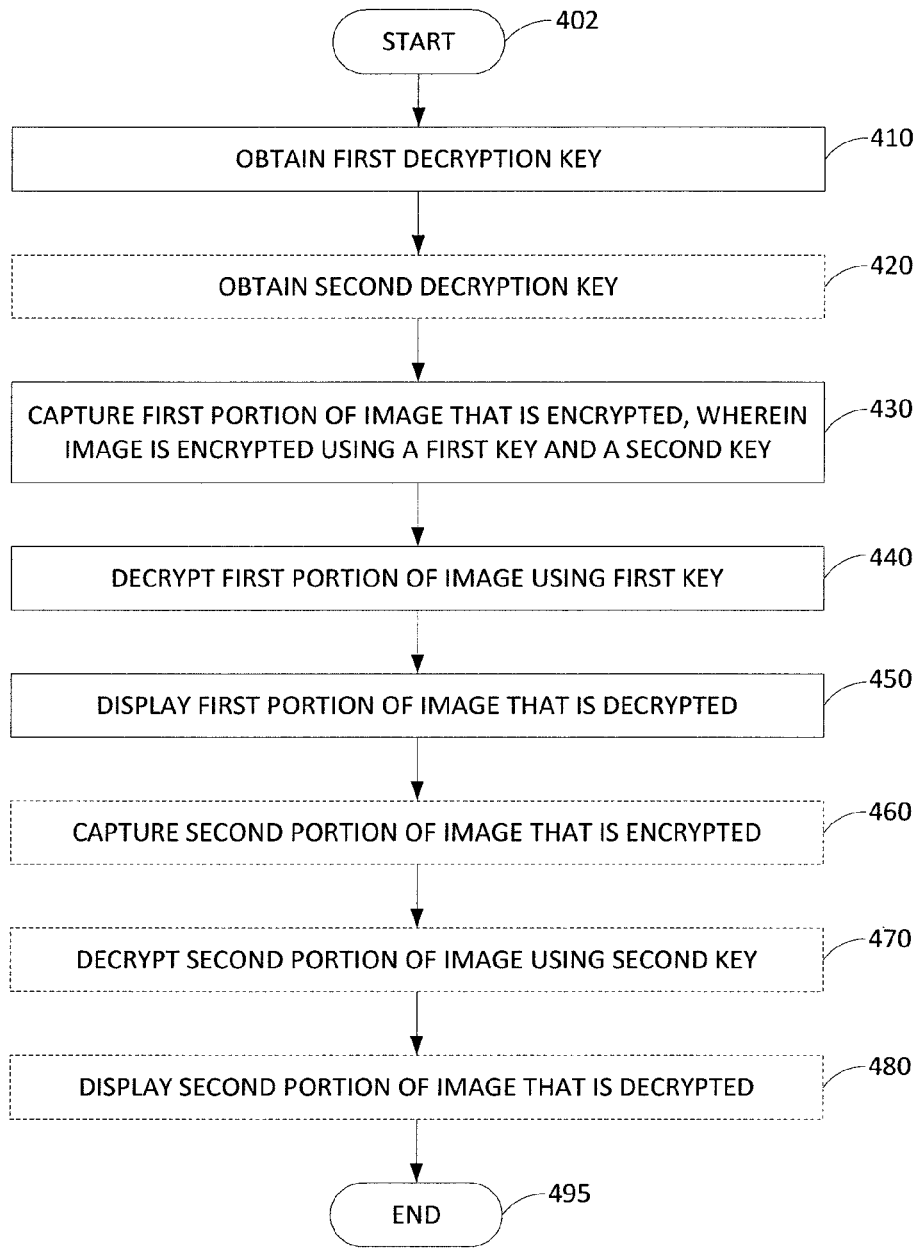
FIG. 4 illustrates an example flowchart of an additional method for decrypting an image.

FIG. 4 illustrates an example flowchart of one embodiment of an additional method 400 for decrypting an image. In one embodiment, the steps, functions, or operations of the method 400 may be performed by the device 150 or a general purpose computer or computing device as described in FIG. 6 and discussed below.

The method 400 begins at step 402 and proceeds to step 410. At step 410, the method 400 obtains a first key. For example, the first key may be for decrypting a first portion of an encrypted image/document. The encrypted document may be for example, instructions or orders from a supervisor or a superior to both a direct subordinate and to lower level personnel. Accordingly, the first decryption key may be for decrypting portions of the document intended only for the direct subordinate. In one embodiment, the decryption key is a symmetric key. In another embodiment, the decryption key comprises a private key corresponding to a public key used to encrypt the document using a public-key encryption technique.

At optional step 420, the method 400 obtains a second key. For example, the second key may be for decrypting other portions of the document intended for a lower level personnel, or intended for multiple recipients. As with the first key, the second key may be a symmetric key or an asymmetric key.

Figure 5:
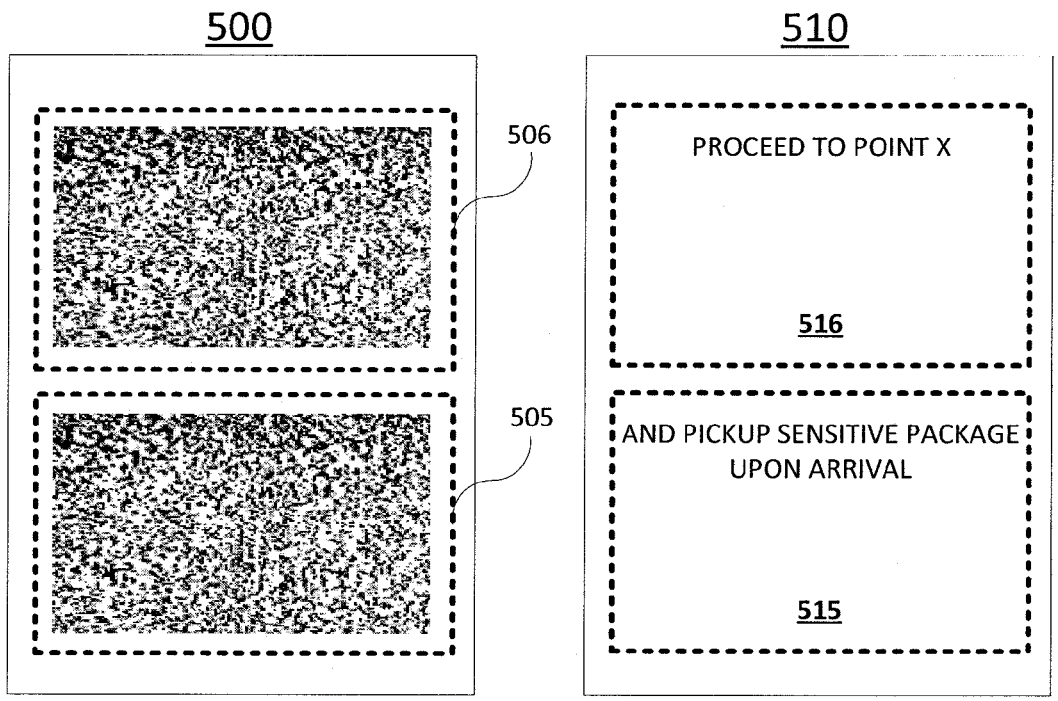
FIG. 5 illustrates another example of a document in encrypted and unencrypted forms.

As an example, FIG. 5 shows an encrypted document 500 having a first portion 505 and a second portion 506. The first portion 505 may be encrypted with a first key and the second portion 506 may be encrypted with a second key that is different from the first key.

At step 430, the method 400 captures a first portion of the document that is encrypted. For instance, as mentioned above the encrypted document may be intended for both a direct subordinate and a lower level personnel. Accordingly, in one embodiment the document is encrypted using both a first encryption key and a second encryption key. For example, the portions of the document encrypted using the first key may be intended for viewing by the direct subordinate while the portions of the document encrypted using the second key may be intended for viewing by the lower level personnel, or for viewing by both the direct subordinate and by the lower level personnel.

At step 440, the method 400 decrypts the first portion of the document using the first key. In one embodiment, the first key is a private key corresponding to a public key used to encrypt the first portion. In another embodiment, the first key is a symmetric key, e.g., using the AES algorithm. Continuing with the above example, the first portion of the image may comprise all or a part of the image that is intended for viewing only by the direct subordinate.

At step 450, the method 400 displays the first portion of the document that is decrypted. For example, the first portion of the document that is decrypted may be presented on a display screen of a device that is performing the method 400 or a display screen that is connected to the device performing the method. In one embodiment, additional portions of the document are displayed, but are displayed in encrypted form unless and until these additional portions are also decrypted.

Referring again to FIG. 5, steps 430-440 of the method 400 may comprise capturing and decrypting the first portion 505 of the encrypted document 500. Also shown in FIG. 5 is an unencrypted, or original version of the document 510. Accordingly, step 450 may comprise displaying an unencrypted version 515 of the first portion.

At optional step 460, the method 400 captures a second portion of the encrypted document.

Thereafter, at optional step 470 the method 400 decrypts the second portion of the encrypted document using the second key. For instance, continuing with the above example, the document may be encrypted using a first key and a second key. The second portion of the document may therefore be encrypted using the second key. The portions of the document encrypted using the first key may comprise portions of the document that are intended only for a direct subordinate whereas the portions of the document that are encrypted using the second key are for a larger number of lower level personnel as well as for the direct subordinate to view. Accordingly, the direct subordinate may be provided with both the first and second keys to enable him or her to decrypt both the first and second portions of the encrypted document. Notably, steps 460-470 may comprise the same or substantially similar operations to those discussed above in connection with steps 430-440.

At optional step 480, the method 400 displays the second portion of the document that is decrypted. For example, a direct subordinate with both the first and second keys will be able to decrypt both the first and second portions of the document, whereas a lower level personnel may only have either the first or second key and is only able to decrypt the respective portion(s) of the document associated with the key in his or her possession. Notably, step 480 may comprise the same or substantially similar operations to those discussed above in connection with step 450.

Returning to the example of FIG. 5, steps 460-480 may comprise capturing and decrypting the second portion 506 of the encrypted document 500 and displaying the unencrypted version of the second portion 516. In this example, the second portion of the document states "proceed to point X" and this information may be made available to both the direct subordinate and the lower level personnel. For example, lower level personnel and the direct subordinate are provided with the second key. However, the first portion of the document provides further instructions to "pickup sensitive package upon arrival". This additional instruction is only viewable by the direct subordinate, e.g., by only providing the first key to the direct subordinate and not to the lower level personnel.

Following step 480, the method proceeds to step 495 where the method ends.

It should be noted that the example of the method 400 describes first and second portions of a document being encrypted using first and second keys respectively. However, in another embodiment, the document may comprise a first portion that is encrypted using a first key while a second larger portion of the document includes the first portion that is previously encrypted using the first key. The second portion of the document is then encrypted using a second key. Accordingly, if the second portion of the encrypted document is decrypted using a second key, it may include plaintext or clear portions, but may also include the first portion which remains encrypted. In other words, the first portion remains un-discernible unless and until it is deciphered using the first key.

Referring to FIG. 5, in a similar embodiment, instead of requiring spatially separated regions 516 and 515 for different decoded messages to appear, two different keys may decrypt one region into wholly different content. Following the example above, if one key is given to a direct subordinate and another key is given to lower level personnel, each key may decrypt content differently with supplementary decryption information (e.g., metadata or state information) that is understood by either the decryption step in 470, the display step in 480, or both.

In another embodiment supplementary decryption information may also come from non-cryptographic sources that have been authenticated, but are still understood (or required) by either the decryption step in 470, the display step in 480, or both—referred to in this paragraph as decoding. In one example, supplementary decryption information regarding the current time and date (as provided by a synchronized and authenticated source) may be delivered to decoding steps such that different images are delivered to the final display. Such time information could be used to display time-sensitive information, such as supplementary instructions on an existing document or confidential announcements that must be globally synchronized. In another example, supplementary decryption information regarding the viewer's current geo-spatial location (as provided by an authenticated source) may be delivered to the decoding steps. In this example, as the reader approaches a certain location, the displayed image may change to a higher-resolution map or include more plaintext information. Both of these examples use supplementary information built on the decryption method in this disclosure to further authenticate readers with device-generated information for specific world-synchronized activities (i.e., location or time).

It should be noted that although not explicitly specified, one or more steps, operations or blocks of the methods 200 and 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIGS. 2 and 4 that recite a determining operation, or involve a decision, do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

FIG. 6 depicts a high-level block diagram of a general-purpose computer or system suitable for use in performing the functions described herein. For example, any one or more components or devices illustrated in FIG. 1 or described in connection with the methods 200 and 400 may be implemented as the system 600. As depicted in FIG. 6, the system 600 comprises a hardware processor element 602 (e.g., a microprocessor, a central processing unit (CPU) and the like), a memory 604, (e.g., random access memory (RAM), read only memory (ROM), a disk drive, an optical drive, a magnetic drive, and/or a Universal Serial Bus (USB) drive), a module 605 for decrypting a document, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps functions and/or operations of the above disclosed methods. In one embodiment, the present module or process 605 for decrypting a document can be implemented as computer-executable instructions (e.g., a software program comprising computer-executable instructions) and loaded into memory 604 and executed by hardware processor 602 to implement the functions as discussed above. As such, the present module or process 605 for decrypting a document as discussed above in methods 200 and 400 (including associated data structures) of the present disclosure can be stored on a non-transitory (e.g., tangible or physical) computer readable storage medium, e.g., RAM memory, magnetic or optical drive or diskette and the like.

It should be noted that the hardware processor can be configured or programmed to cause other devices to perform one or more operations as discussed above. In other words, the hardware processor may serve the function of a central controller directing other devices to perform the one or more operations as discussed above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for decrypting an image, the method comprising:
   capturing, by a processor, a portion of the image, wherein the image is encrypted;
   decrypting, by the processor, the portion of the image using a decryption key, wherein the portion of the image contains partial information for an adjacent portion of the image;
   displaying, by the processor, the portion of the image that is decrypted; and
   displaying, by the processor, the adjacent portion of the image using the partial information for the adjacent portion of the image.

2. The method of claim 1, wherein the image is encrypted on a block by block basis.

3. The method of claim 1, wherein the image comprises a printed document.

4. The method of claim 1, wherein the image comprises an electronic document.

5. The method of claim 1, wherein the processor comprises a processor of a mobile end point device.

6. The method of claim 1, further comprising:
capturing the adjacent portion of the image;
decrypting the adjacent portion of the image; and
displaying the adjacent portion of the image that is decrypted at a higher resolution.

7. The method of claim 1, wherein the decryption key comprises a private key of a public key-private key pair.

8. A non-transitory computer-readable medium storing instructions which, when executed by a processor, cause the processor to perform operations for decrypting an image, the operations comprising:
capturing a portion of the image, wherein the image is encrypted;
decrypting the portion of the image using a decryption key, wherein the portion of the image contains partial information for an adjacent portion of the image;
displaying the portion of the image that is decrypted; and
displaying the adjacent portion of the image using the partial information for the adjacent portion of the image.

9. The non-transitory computer-readable medium of claim 8, wherein the image is encrypted on a block by block basis.

10. The non-transitory computer-readable medium of claim 8, wherein the image comprises a printed document.

11. The non-transitory computer-readable medium of claim 8, wherein the image comprises an electronic document.

12. The non-transitory computer-readable medium of claim 8, wherein the processor comprises a processor of a mobile end point device.

13. The non-transitory computer-readable medium of claim 8, further comprising:
capturing the adjacent portion of the image;
decrypting the adjacent portion of the image; and
displaying the adjacent portion of the image that is decrypted at a higher resolution.

14. The non-transitory computer-readable medium of claim 8, wherein the decryption key comprises a private key of a public key-private key pair.

15. An apparatus for decrypting an image, the apparatus comprising:
a processor; and
a computer readable medium storing a plurality of instructions which, when executed by the processor, cause the processor to perform operations, the operations comprising:
capturing a portion of the image, wherein the image is encrypted;
decrypting the portion of the image using a decryption key, wherein the portion of the image contains partial information for an adjacent portion of the image;
displaying the portion of the image that is decrypted; and
displaying the adjacent portion of the image using the partial information for the adjacent portion of the image.

16. The apparatus of claim 15, wherein the image is encrypted on a block by block basis.

17. The apparatus of claim 15, wherein the image comprises a printed document.

18. The apparatus of claim 15, wherein the image comprises an electronic document.

19. The apparatus of claim 15, wherein the processor comprises a processor of a mobile end point device.

20. The apparatus of claim 15, further comprising:
capturing the adjacent portion of the image;
decrypting the adjacent portion of the image; and
displaying the adjacent portion of the image that is decrypted at a higher resolution.

* * * * *